US008859056B2

(12) United States Patent
O'Neill et al.

(10) Patent No.: US 8,859,056 B2
(45) Date of Patent: Oct. 14, 2014

(54) BONDING AN ADHERENT TO A SUBSTRATE VIA A PRIMER

(75) Inventors: Liam O'Neill, Midleton (IE); Frederic Gubbels, Houtain-le-Val (BE); Stuart Leadley, Waterloo (BE); Nick Shephard, Midland, MI (US)

(73) Assignee: Dow Corning Ireland, Ltd., Midleton, Co. Cork (IE)

( * ) Notice: Subject to any disclaimer, the term of this patent is extended or adjusted under 35 U.S.C. 154(b) by 1027 days.

(21) Appl. No.: 11/913,855

(22) PCT Filed: May 10, 2006

(86) PCT No.: PCT/US2006/018022
§ 371 (c)(1),
(2), (4) Date: Jun. 23, 2008

(87) PCT Pub. No.: WO2006/124437
PCT Pub. Date: Nov. 23, 2006

(65) Prior Publication Data
US 2009/0220794 A1 Sep. 3, 2009

(30) Foreign Application Priority Data

May 12, 2005 (GB) .................................. 0509648.2

(51) Int. Cl.
| | |
|---|---|
| B05D 5/10 | (2006.01) |
| H05H 1/24 | (2006.01) |
| C23C 4/12 | (2006.01) |
| C09J 5/02 | (2006.01) |
| C23C 4/02 | (2006.01) |
| C23C 4/18 | (2006.01) |
| B05D 1/00 | (2006.01) |

(52) U.S. Cl.
CPC . *C09J 5/02* (2013.01); *C23C 4/127* (2013.01); *C23C 4/121* (2013.01); *C23C 4/02* (2013.01); *B05D 1/62* (2013.01); *C23C 4/18* (2013.01)
USPC .................... 427/569; 427/207.1; 427/578

(58) Field of Classification Search
CPC ........ C09J 5/02; C09J 143/04; C09J 151/085; C09J 183/04; C09D 183/04; C09D 183/06; C08J 7/042
USPC .......... 427/207.1, 569, 578; 118/723 R, 723 E
See application file for complete search history.

(56) References Cited

U.S. PATENT DOCUMENTS 4,130,707 A * 12/1978 Leiser et al. .................... 528/15
4,212,719 A  7/1980 Osada et al.
(Continued)

FOREIGN PATENT DOCUMENTS

| DE | 19546187 | 6/1997 |
|---|---|---|
| DE | 19742619 | 1/1999 |

(Continued)

OTHER PUBLICATIONS

The Cassell Paperback English Dictionary, Cassell Publishers Limited 1990, pages "Infusionism—Ink".

(Continued)

*Primary Examiner* — Michael Wieczorek
(74) *Attorney, Agent, or Firm* — Howard & Howard Attorneys PLLC

(57) ABSTRACT

A method of bonding an adherent to a substrate, wherein a primer is applied to the substrate by plasma deposition and the adherent is bonded to the primer treated surface of the substrate, and the primer contains functional groups which chemically bond to functional groups in the adherent.

12 Claims, 2 Drawing Sheets

(56) References Cited

U.S. PATENT DOCUMENTS

Figure 1:
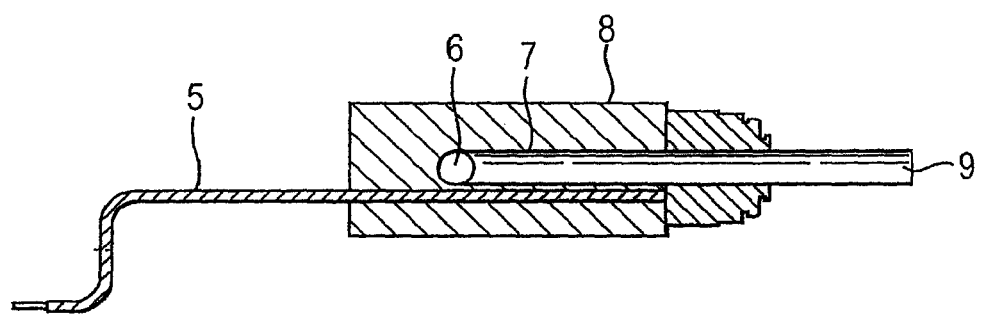

| | | | |
|---|---|---|---|
| 4,582,746 A | 4/1986 | Shirahata et al. | |
| 4,588,641 A | 5/1986 | Haque et al. | |
| 4,929,319 A | 5/1990 | Dinter et al. | |
| 5,026,463 A | 6/1991 | Dinter et al. | |
| 5,041,304 A | 8/1991 | Kusano et al. | |
| 5,110,618 A | 5/1992 | Faust | |
| 5,185,132 A | 2/1993 | Horiike et al. | |
| 5,190,807 A * | 3/1993 | Kimock et al. | 428/216 |
| 5,290,378 A | 3/1994 | Kusano et al. | |
| 5,340,454 A | 8/1994 | Schaefer et al. | |
| 5,340,618 A | 8/1994 | Tanisaki et al. | |
| 5,366,770 A | 11/1994 | Wang | |
| 5,414,324 A | 5/1995 | Roth et al. | |
| 5,529,631 A | 6/1996 | Yoshikawa et al. | |
| 5,543,017 A | 8/1996 | Uchiyama et al. | |
| 5,620,743 A | 4/1997 | Harth et al. | |
| 5,835,677 A | 11/1998 | Li et al. | |
| 5,876,753 A * | 3/1999 | Timmons et al. | 427/488 |
| 5,904,952 A | 5/1999 | Lopata et al. | |
| 5,944,901 A | 8/1999 | Landes et al. | |
| 5,981,682 A * | 11/1999 | Onishi | 528/31 |
| 6,086,710 A | 7/2000 | Miyashita et al. | |
| 6,285,032 B1 | 9/2001 | Hahne et al. | |
| 6,331,689 B1 | 12/2001 | Branston et al. | |
| 6,342,275 B1 | 1/2002 | Miyakawa et al. | |
| 6,368,665 B1 | 4/2002 | Hunt et al. | |
| 6,396,214 B1 | 5/2002 | Grosse et al. | |
| 6,613,394 B2 | 9/2003 | Kuckertz et al. | |
| 6,705,127 B1 | 3/2004 | Cain et al. | |
| 6,706,320 B2 * | 3/2004 | Filippou et al. | 427/223 |
| 6,746,721 B1 | 6/2004 | Moser | |
| 6,800,336 B1 * | 10/2004 | Fornsel et al. | 427/562 |
| 2001/0020448 A1 | 9/2001 | Vaartstra et al. | |
| 2002/0015797 A1 | 2/2002 | Hunt et al. | |
| 2002/0129902 A1 | 9/2002 | Babayan et al. | |
| 2002/0192057 A1 | 12/2002 | Meulen | |
| 2004/0022945 A1* | 2/2004 | Goodwin et al. | 427/255.27 |
| 2004/0050685 A1 | 3/2004 | Yara et al. | |
| 2004/0161528 A1 | 8/2004 | Martinez et al. | |
| 2005/0158480 A1 | 7/2005 | Goodwin et al. | |
| 2005/0178330 A1 | 8/2005 | Goodwin et al. | |
| 2005/0214476 A1 | 9/2005 | Goodwin et al. | |
| 2005/0241582 A1 | 11/2005 | Dobbyn et al. | |
| 2007/0166479 A1 | 7/2007 | Drake et al. | |
| 2008/0118734 A1 | 5/2008 | Goodwin et al. | |
| 2009/0220794 A1 | 9/2009 | O'Neill et al. | |

FOREIGN PATENT DOCUMENTS

| | | |
|---|---|---|
| DE | 19924108 | 11/2000 |
| DE | 19955880 | 5/2001 |
| EP | 0431951 | 6/1991 |
| EP | 0617142 | 9/1994 |
| EP | 0809275 | 11/1997 |
| EP | 0896035 | 2/1999 |
| EP | 1326718 | 7/2003 |
| FR | 2713511 | 6/1995 |
| GB | 2252559 | 8/1992 |
| GB | 2259185 | 3/1993 |
| GB | 2326165 | 12/1998 |
| JP | 62227905 | 10/1987 |
| JP | 03-115578 | 5/1991 |
| JP | 07-062546 | 3/1995 |
| JP | 07-066549 A | 3/1995 |
| JP | 07-138761 | 5/1995 |
| JP | 07-328427 | 12/1995 |
| JP | 08-078529 | 3/1996 |
| JP | 08-259901 A | 10/1996 |
| JP | 10-275698 | 10/1998 |
| JP | 11-029873 | 2/1999 |
| JP | 11-241165 | 9/1999 |
| JP | 2000-192261 | 7/2000 |
| JP | 2000-212753 | 8/2000 |
| JP | 2000-319427 | 11/2000 |
| JP | 2001-087643 | 4/2001 |
| JP | 2002-057440 | 2/2002 |
| KR | 19890002286 A | 4/1989 |
| KR | 20080007587 A | 1/2008 |
| WO | WO95/18249 | 7/1995 |
| WO | WO98/10116 | 3/1998 |
| WO | WO99/05358 | 2/1999 |
| WO | WO99/06204 | 2/1999 |
| WO | WO99/08803 | 2/1999 |
| WO | WO99/66096 | 12/1999 |
| WO | WO01/38596 | 5/2001 |
| WO | WO01/40359 | 6/2001 |
| WO | WO01/41942 | 6/2001 |
| WO | WO01/59809 | 8/2001 |
| WO | WO01/76773 | 10/2001 |
| WO | WO02/26401 | 4/2002 |
| WO | WO02/28548 | 4/2002 |
| WO | WO02/35576 | 5/2002 |
| WO | WO02/40742 | 5/2002 |
| WO | 03097245 A2 | 11/2003 |

OTHER PUBLICATIONS

Concise Science Dictionary, Second Edition, Oxford University Press, 1991, pp. 166-167 and 570-571.
Goossens et al, "Application of Atmospheric Pressure Dielectric Barrier Discharges in Deposition, Cleaning and Activation", Surfaces & Coatings Technology, 142-144 (2001) 474-481.
Goossens et al, "The DC Glow Discharge at Atmospheric Pressure", IEEE Transactions on Plasma Science, vol. 30, Feb. 1, 2002, pp. 176-177.
Kanazawa et al., "Glow Plasma Treatment at Atmospheric Pressure for Surface Modification and Film Deposition", Nuclear Instruments and Method in Physics Research, 1989, pp. 842-845.
S. Kanazawa et al., "Stable Glow Plasma at Atmospheric Pressure", J. Phys. D: Appl. Phys. 21 (1988) pp. 838-840.
Karthikeyan, "Plasma Spray Synthesis of Nanomaterial Powders and Deposits", Materials Science and Engineering, Sep. 6, 1996, pp. 275-286.
Kunhardt, "Generation of Large-Volume, Atmospheric-Pressure, Nonequilibrium Plasmas", IEE Transactions on Plasma Science, vol. 28, No. 1, Feb. 2000, pp. 189-200.
Massines et al., "Experimental and Theoretical Study of a Glow Discharge at Atmospheric Pressure Controlled by Dielectric Barrier", Journal of Applied Physics, vol. 83, No. 6, Mar. 15, 1998, pp. 2950-2956.
Bolte et al., "Neues Primerverfahren fur Metalloberflachen zur nachfolgenden UV-Lackierung" Coatings Feb. 1998, pp. 38-40.
S. Okazaki et al., "Glow Discharge Plasma at Atmospheric Pressure and Its Application", Proc. Jpn. Symp. Plasma Chem./ vol. 2. 1989, pp. 95-102.
Park et al, "Gas Breakdown in an Atmospheric Pressure Radio Frequency Capacitive Plasma Source", Journal of Applied Physics, vol. 89, No. 1, Jan. 2001.
Plasma Dictionary: Term: Glow Discharge extracted from hhtp://plasmadictionaory.llnl.gov/terms lasso?0Max/Records=1&SkinRecords=1&Sort, dated Nov. 13, 2006.
J. R. Roth, "Industrial Plasma Engineering", Institute of Physics, London (2001), pp. 55-58.
Salge, "Plasma-assisted Deposition at Atmospheric Pressure", Surface and Coatings Technology, 80, 1996, pp. 1-7.
Sawada, "Synthesis of Plasma-Polymerized Tetraethoxysilane and Hexamethyldisiloxane Films Prepared by Atmospheric Pressure Glow Discharge", Phys. D. Appl. Phys. 28, 1995, pp. 1661-1669.
Schütze et al., "The Atmospheric-Pressure Plasma Jet: A Review and Comparison . . . ", IEEE Trans on Plasma Science, vol. 26, No. 6, 1998, pp. 1685-1694.
Tendero et al., "Atmospheric Pressure Plasmas: A Review", Spectrochimica Acta Part B, 2005, pp. 1-16.
Thyen, "Plasmas-enhanced Chemical-Vapour-Deposition of Thin Films by Corona Discharge at Atmospheric Pressure", Surface and Coatings Technology 1997, pp. 426-434.
Bolte et al., "Translation of Neues Primerverfahren fur Metalloberflachen zur nachfolgenden UV-Lackierung" (New Primer Process for Metallic Surfaces for Subsequent UV Lacquering), five pages.

(56) References Cited

OTHER PUBLICATIONS

Yokoyama et al., "The Improvement of the Atmospheric-Pressure Glow Plasma Method and the Deposition of Organic Films", J. Phys. D: Appl. Phys. 23, 1990, pp. 374-377.
English language abstract for DE 19546187, Jun. 12, 1997.
English language abstract for DE19742619, Jan. 28, 1999.
English language abstract for DE19924108, Nov. 30, 2000.
English language abstract for DE19955880, May 23, 2001.
English language abstract for FR2713511, Jun. 16, 1995.
English language Abstract for JP62227905A2, Oct. 6, 1987.
English language abstract and translation for JP07-062546, Mar. 7, 1995.
English language abstract and translation for JP07-138761, May 30, 1995.
English language abstract and translation for JP07-328427, Dec. 19, 1995.
English language abstract and translation for JP08-078529, Mar. 22, 1996.
English language abstract and translation for JP1075698, Oct. 13, 1998.
English language abstract and translation for JP11-029873, Feb. 2, 1999.
English language abstract for JP11-241165, Sep. 7, 1999.
English language abstract and translation for JP2000-192261, Jul. 11, 2000.
English language abstract and translation for JP2000-212753, Aug. 2, 2000.
English language abstract and translation for JP2000-319427, Nov. 21, 2000.
English language abstract and translation for JP2001-087643, Apr. 3, 2001.
English language abstract and translation for JP2002-057440, Feb. 22, 2002.
English language abstract for WO95/18249, Jul. 6, 1995.
English language abstract for WO99/06204, Feb. 11, 1999.
English language abstract for WO99/66096, Dec. 23, 1999.
English language abstract for WO01/38596, May 31, 2001.
English language abstract for WO01/41942, Jun. 14, 2001.
English language abstract for WO01/76773, Oct. 18, 2001.
English language abstract for WO02/26401, Apr. 4, 2002.
English language abstract for WO02/40742, May 23, 2002.
English language abstract and translation for JP 07-066549 extracted from the PAJ database on Jul. 3, 2012, 37 pages.
English language abstract and translation for JP 08-259901 extracted from the PAJ database on Jul. 3, 2012, 32 pages.

* cited by examiner

BONDING AN ADHERENT TO A SUBSTRATE VIA A PRIMER

RELATED APPLICATIONS

This application claims priority to and all the advantages of International Patent Application No. PCT/US2006/018022, filed on May 10, 2006, which claims priority to Great Britain Patent Application No. GB 0509648.2, filed on May 12, 2005.

This invention describes a method for providing increased adhesion between an adherent and a substrate. The adherent can be a coating layer on the substrate (including but not limited to a coating layer of an adhesive or a sealant) or can be an adhesive layer coated on a second substrate to which the first-mentioned substrate is to be bonded.

The invention uses a primer layer to increase the adhesion between the adherent and the substrate. The primer bonds strongly to the substrate and to the adherent.

Plasma techniques have been used to pretreat substrate surfaces to improve the adhesion of a subsequently applied coating. The effects of plasma pre-treatment can include cleaning, degradation and ablation of the surface regions of a polymeric substrate, cross-linking of the surface region of a polymer substrate, oxidation leading to the introduction of polar groups, such as carbonyl groups, into the surface regions of the substrate, and/or ion implantation in the surface regions of the substrate. WO-A-02/098962 describes a method of coating a surface of a low energy substrate by exposing the substrate to a silicon-containing compound and post-treating the treated surface by oxidation or reduction using a plasma, in particular atmospheric pressure glow discharge or dielectric barrier discharge, or corona treatment.

EP-A-431951 describes a system for treating a substrate with the gases exiting a parallel plate reactor. This comprises flowing a gas through one or more parallel plate reactors and allowing the excited species to interact with a substrate placed adjacent to the gas exit. Gherardi, N. et. al., J. Phys D: Appl. Phys, 2000, 33, L104-L108 describe the production of a silica coating by passing a mixture of $N_2$, $SiH_4$ and $N_2$ through a dielectric barrier discharge (DBD) plasma formed between two parallel electrodes. The species exiting the reactor were allowed to deposit on a downstream substrate.

The treatment of several different plastic substrates by injecting trimethylsilyldimethylamine or hexamethyldisilazane into an argon glow discharge is described by Inagaki et al. in Int. J. Adhesion Adhesives, 2, 233, 1982.

WO-A-02/28548 describes a method for forming a coating on a substrate by introducing an atomised liquid and/or solid coating-forming material into an atmospheric pressure plasma discharge and/or an ionised gas stream resulting therefrom, and exposing the substrate to the atomised coating-forming material under conditions of atmospheric pressure. WO-A-03/097245 describes a method in which an atomised coating-forming material, upon leaving an atomiser, passes through an exciting medium to a substrate positioned remotely from the exciting medium.

Glow discharge polymerisation of tetramethyldisiloxane has been used to deposit 30 nm thick primer layers on platinum wire prior to coating with a few micron thick layer of poly(p-xylylene) (Nichols et al., J. Appl. Polymer Sci., Appl. Polymer Symp, 38, 21, 1984).

WO-A-99/20809 describes a method in which a gaseous precursor is introduced into an arcless atmospheric pressure RF plasma discharge in a gas flowing from the closed to the open end of an electrically conducting annular chamber surrounding an electrode so that the precursor reacts with the reactive species in the plasma to form a material which exits through the open end in a gaseous jet and is deposited on a substrate placed in the path of the jet. EP 1230414 describes a method for coating a surface wherein a plasma jet is produced by conveying a working gas through an excitation zone in which an arc discharge is produced by applying a high frequency AC voltage to electrodes. A precursor is introduced into the plasma jet separately from the working gas. A reaction of the precursor is triggered with the aid of the plasma jet, and the reaction product is deposited on the surface to be coated.

In a method of bonding an adherent to a substrate according to the invention, a primer is applied to the substrate by plasma deposition and the adherent is bonded to the primer treated surface of the substrate, and the primer contains functional groups which chemically bond to functional groups in the adherent.

The adherent can be a coating layer applied over the primer or can be an adhesive layer coated on a second substrate to which the first-mentioned substrate is to be bonded.

Thus according to one aspect, the invention includes a coated article comprising a substrate coated with a coating layer applied over a primer, characterised in that the primer is applied to the substrate by plasma deposition and the adherent contains functional groups chemically bonded to functional groups in the primer.

According to a further aspect, the invention includes a bonded article comprising two substrates bonded by an adhesive which is applied over a primer on at least one of the substrates, characterised in that the primer is applied to the substrate by plasma deposition and the adherent contains functional groups chemically bonded to functional groups in the primer.

The plasma which is used for deposition of the primer is preferably a non-equilibrium atmospheric pressure plasma. Such a plasma can for example be generated within a dielectric housing having an inlet and a plasma outlet through which a process gas flows from the inlet to the outlet past at least one electrode. The substrate to be treated can be positioned adjacent to the plasma outlet so that the substrate is in contact with the plasma, and moved relative to the plasma outlet.

The primer, or a precursor thereof, is preferably introduced into the plasma-forming apparatus in atomised form. In one method of atomising the primer, the process gas and primer are passed through an atomiser in which the process gas atomises the primer. In another method, the atomised primer is injected into the plasma downstream from the electrode. The primer may undergo chemical reaction in the plasma, for example it may be polymerised, provided that at least some of the functional groups in the primer which react with functional groups in the adherent are retained.

We have found that that plasma deposition improves the adhesion of the primer to the substrate. The presence of functional groups in the adherent which chemically bond to functional groups in the primer improves primer/topcoat adhesion. The use of atmospheric pressure plasma to deposit the primer has the advantage that it improves primer adhesion to the substrate without risk of destroying the functional groups in the primer that are required to improve bonding to the adherent. The plasma deposited primer can be specifically chosen to form chemical bonds with components within the adherent. The formulation of the adherent can be tailored to enhance adhesion at the substrate/adherent interface through chemical bonding to the primer.

Figure 2:
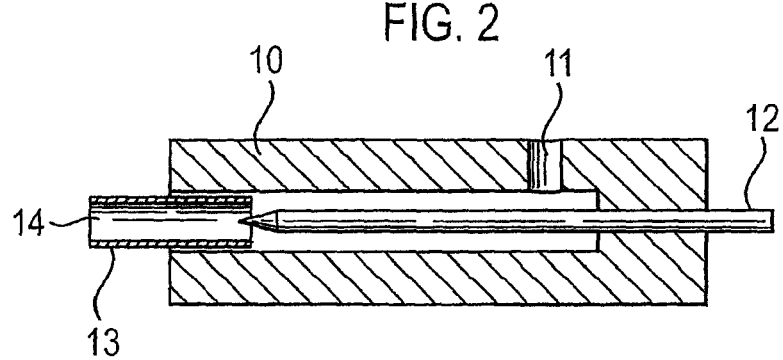
Figure 3:
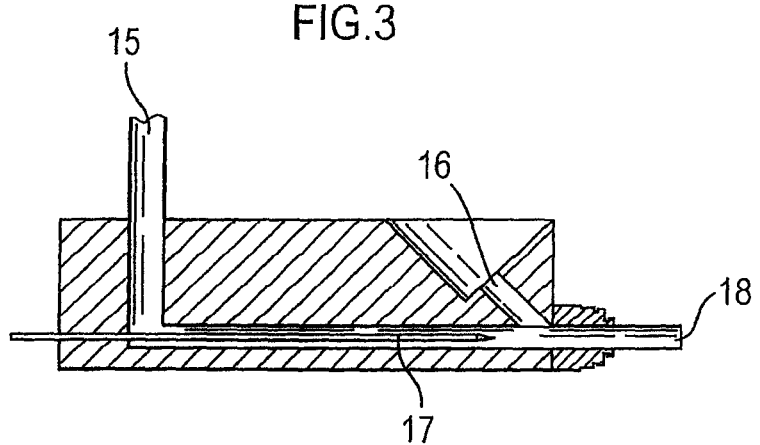
Figure 4:
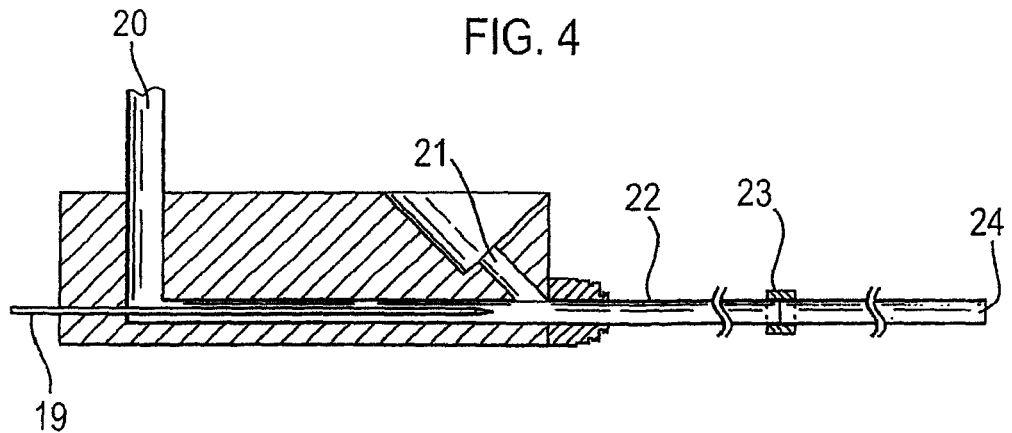

FIG. 1 is a diagrammatic cross-section of an apparatus for plasma treating a surface according to the invention FIG. 2 is a diagrammatic cross-section of an alternative apparatus for plasma treating a surface according to the invention FIG. 3 is a diagrammatic cross-section of another alternative apparatus for plasma treating a surface according to the invention FIG. 4 is a diagrammatic cross-section of an apparatus as shown in FIG. 3 with a longer tube extending from the plasma generating device The plasma can in general be any type of non-equilibrium atmospheric pressure plasma such as a dielectric barrier discharge plasma or a diffuse dielectric barrier discharge such as a glow discharge plasma. For the purposes of this invention 'plasma deposition' includes deposition by a non-uniform discharge such as a corona discharge. A diffuse dielectric barrier discharge plasma or glow discharge plasma is preferred. Preferred processes use "low temperature" plasmas wherein the term "low temperature" is intended to mean below 200° C., and preferably below 100° C. These are plasmas where collisions are relatively infrequent (when compared to thermal equilibrium plasmas such as flame based systems) which have their constituent species at widely different temperatures (hence the general name "non-thermal equilibrium" plasmas).

One preferred device according to the invention for generating a non-equilibrium atmospheric pressure plasma has only a single electrode. Despite the lack of a counter electrode, the device still gives rise to a non-equilibrium plasma flame. The presence of a powered electrode in the vicinity of a working gas such as helium is sufficient to generate a strong RF field which can give rise to a plasma ionisation process and forms an external plasma jet.

One example of such a device having only a single electrode is shown in FIG. 1. This design consists of a tube (7), surrounded by a suitable dielectric material (8). The tube (7) extends beyond the dielectric housing (8). The process gas, optionally containing an atomized surface treatment agent, enters an opening (6). A single electrode (5) is placed outside the tube and this is encased in a layer of the dielectric material (8). The electrode is connected to a suitable power supply. No counter electrode is required. When power is applied, local electric fields form around the electrode. These interact with the gas within the tube and a plasma is formed, which extends to and beyond an aperture (9) at the end of tube (7).

In an alternative design having improved capability to form nitrogen plasma jets as well as helium and argon plasma jets, and improved firing of the plasma, a bare metal electrode is used. A single, preferably sharp, electrode is housed within a dielectric housing such as a plastic tube through which the process gas and optionally an aerosol (atomised surface treatment agent) flow. As power is applied to the needle electrode, an electric field forms and the process gas is ionised.

This can be better understood by referring to FIG. 2. This shows a metal electrode (12) housed within a suitable chamber (10). This chamber may be constructed from a suitable dielectric material such as polytetrafluoroethylene (PTFE). The dielectric housing can be of any electrically non-conductive, e.g. plastics, material, for example polyamide or polypropylene, as an alternative to PTFE. The process gas and aerosol enter into the chamber through one or more apertures (11) in the housing. As an electric potential is applied to the electrode, the process gas becomes ionised, and the resultant plasma is directed so that it extends out through an opening (14) of an exit pipe (13). By adjusting the size and shape of the exit pipe (13), the size, shape and length of the low temperature non-equilibrium atmospheric pressure plasma jet can be adjusted.

The use of a metal electrode with a sharp point facilitates plasma formation. As an electric potential is applied to the electrode, an electric field is generated which accelerates charged particles in the gas forming a plasma. The sharp point aids the process, as the electric field density is inversely proportional to the radius of curvature of the electrode. The electrode can also give rise to a leakage of electrons into the gas due to the high secondary electron emission coefficient of the metal. As the process gas moves past the electrode, the plasma species are carried away from the electrode to form a plasma jet.

In a still further embodiment of the present invention the plasma jet device consists of a single hollow electrode, without any counter electrode. A gas is blown through the centre of the electrode. RF power is applied and this leads to the formation of strong electromagnetic fields in the vicinity of the electrode. This causes the gas to ionise and a plasma forms which is carried through the electrode and exits as a plasma jet. The narrow nature of this design allows for focussed, narrow plasmas to be generated under ambient conditions for depositing functional coatings on a three-dimensionally shaped substrate.

More generally, the electrode or electrodes can take the form of pins, plates, concentric tubes or rings, or needles via which gas can be introduced into the apparatus. A single electrode can be used, or a plurality of electrodes can be used. The electrodes can be covered by a dielectric, or not covered by a dielectric. If multiple electrodes are used, they can be a combination of dielectric covered and non-covered electrodes. One electrode can be grounded or alternatively no electrodes are grounded (floating potential). If no electrodes are grounded, the electrodes can have the same polarity or can have opposing polarity. A co-axial electrode configuration can be used in which a first electrode is placed co-axially inside a second electrode. One electrode is powered and the other may be grounded, and dielectric layers can be included to prevent arcing, but this configuration is less preferred.

The electrode may be made of any suitable metal and can for example be in the form of a metal pin e.g. a welding rod, or a flat section. Electrodes can be coated or incorporate a radioactive element to enhance ionisation of the plasma. A radioactive metal may be used, for example the electrode can be formed from tungsten containing 0.2 to 20% by weight, preferably about 2%, radioactive thorium. This promotes plasma formation through the release of radioactive particles and radiation which can initiate ionisation. Such a doped electrode provides more efficient secondary electron emission and therefore device is easy to strike.

The power supply to the electrode or electrodes is a radio frequency power supply as known for plasma generation, that is in the range 1 kHz to 300 GHz. Our most preferred range is the very low frequency (VLF) 3 kHz-30 kHz band, although the low frequency (LF) 30 kHz-300 kHz range can also be used successfully. One suitable power supply is the Haiden Laboratories Inc. PHF-2K unit which is a bipolar pulse wave, high frequency and high voltage generator. It has a faster rise and fall time (<3 μs) than conventional sine wave high frequency power supplies. Therefore, it offers better ion generation and greater process efficiency. The frequency of the unit is also variable (1-100 kHz) to match the plasma system. The voltage of the power supply is preferably at least 1 kV up to 10 kV or more.

In general the process gas used to produce the plasma can be selected from a range of process gases, including helium, argon, oxygen, nitrogen, air, carbon dioxide, nitrous oxide and mixtures of said gases with each other or with other materials. Most preferably the process gas comprises an inert gas substantially consisting of helium, argon and/or nitrogen, that is to say comprising at least 90% by volume, preferably at least 95%, of one of these gases or a mixture of two or more of them.

The primer or a precursor of the primer is introduced into the plasma-forming apparatus in atomized form. The atomised primer can for example be a polymerisable precursor. When a polymerisable precursor is introduced into the plasma jet, preferably as an aerosol, a controlled plasma polymerisation reaction occurs which results in the deposition of a plasma polymer on any substrate which is placed adjacent to the plasma outlet. Using the process of the invention, a range of primer coatings have been deposited onto numerous substrates. These coatings are grafted to the substrate and retain the functional chemistry of the primer precursor molecule.

The atomiser preferably uses a gas to atomise the surface treatment agent. The electrode(s) can be combined with the atomiser within the housing. Most preferably, the process gas used for generating the plasma is used as the atomizing gas to atomise the surface treatment agent. The atomizer can for example be a pneumatic nebuliser, particularly a parallel path nebuliser such as that sold by Burgener Research Inc. of Mississauga, Ontario, Canada, or that described in U.S. Pat. No. 6,634,572, or it can be a concentric gas atomizer. The atomizer can alternatively be an ultrasonic atomizer in which a pump is used to transport the liquid surface treatment agent into an ultrasonic nozzle and subsequently it forms a liquid film onto an atomising surface. Ultrasonic sound waves cause standing waves to be formed in the liquid film, which result in droplets being formed. The atomiser preferably produces drop sizes of from 10 to 100 μm, more preferably from 10 to 50 μm. Suitable atomisers for use in the present invention are ultrasonic nozzles from Sono-Tek Corporation, Milton, N.Y., USA. Alternative atomisers may include for example electrospray techniques, methods of generating a very fine liquid aerosol through electrostatic charging. The most common electrospray apparatus employs a sharply pointed hollow metal tube, with liquid pumped through the tube. A high-voltage power supply is connected to the outlet of the tube. When the power supply is turned on and adjusted for the proper voltage, the liquid being pumped through the tube transforms into a fine continuous mist of droplets. Inkjet technology can also be used to generate liquid droplets without the need of a carrier gas, using thermal, piezoelectric, electrostatic and acoustic methods.

Thus the process gas fed through inlet (6) of FIG. 1 or through inlet (11) of FIG. 2 can contain the primer or primer precursor in atomised form. This can be achieved either by using the process gas as the atomising gas in at atomiser feeding the inlet or by combining the process gas stream with an atomised primer. In an alternative arrangement to that shown in FIG. 1, an electrode is positioned on either side of an atomiser which acts as the inlet for the process gas and for the primer. The electrodes can for example both extend beyond the tip of the atomiser. In such an arrangement, the electrodes preferably have the same polarity.

In one embodiment of the invention the electrode is combined with the atomizer in such a way that the atomizer acts as the electrode. For example, if a parallel path atomizer is made of conductive material, the entire atomizer device can be used as an electrode. Alternatively a conductive component such as a needle can be incorporated into a non-conductive atomizer to form the combined electrode-atomiser system.

FIG. 3 shows a modified version of the pin type electrode system shown in FIG. 2. In FIG. 3, the process gas enters upstream (15) of the plasma. An atomised primer can be incorporated in the flow of process gas (15). Alternatively, the aerosol of atomised primer can be introduced directly into the plasma. This is achieved by having a second gas entry point (16) located close to the tip of the electrode (17). The aerosol of atomised primer can be added directly at this point (16), with the main process gas still entering upstream of the plasma region (15). Alternatively, some of the process gas can also be added with the aerosol adjacent to the tip of the electrode. Using this setup, the plasma and precursor exit though a suitable tube (18) extending from the outlet of the dielectric housing surrounding the electrode (17). The gas entry point (16) is preferably an inlet angled towards the outlet (18) of the housing.

The tube (18) extends the plasma jet, for example up to 300 mm from the tip of the electrode (17). The tube (18) is formed at least partly of dielectric material such as plastics, for example polyamide, polypropylene or PTFE. The tube is preferably flexible so that the plasma outlet can be moved relative to the substrate. In order to stabilise the plasma jet over lengths greater than 300 mm., it is beneficial to use conductive cylinders, preferably with sharp edges, to connect adjacent pieces of pipe. These cylinders are preferably not grounded. Preferably, these rings have a round sharp edge on both sides. As it passes inside these metal cylinders, the process gas is in contact with metal. The free electrons created inside the plasma region induce a strong electric field near sharp conductive edges that ionize further the process gas inside the pipe. The sharp edge on the other side of the cylinder creates a strong electric field that initiates the ionization of the gas in the following pipe section. In this way the plasma inside the pipe is extended. Use of multiple metal connectors enables the plasma to be extended over several meters, for example 3 to 7 meters.

FIG. 4 shows a modified device of the type shown in FIG. 3 which generates long plasmas for the treatment of conducting substrates or of the inside of 3-d objects or tubes. As in FIG. 3, a powered electrode (19) interacts with a process gas (20) and aerosol (21) of atomised primer to produce a plasma. The length of the plasma jet is extended by confining the plasma to a tube (22) as it leaves the device. As long as the plasma is confined within this tube, then the plasma is not quenched by interaction with the external atmosphere. In order to further extend the plasma length, conductive pieces (23) are incorporated into the tube (22) to connect adjacent pieces of the tube. The conductive metal rings (23) have a round sharp edge on both sides. The resulting plasma may be extended over a considerable distance before exiting through plasma outlet (24) and depositing the primer on a substrate adjacent to the plasma outlet (24).

The substrate which is to be primer coated is positioned adjacent to the plasma outlet so that the substrate is in contact with the plasma and is moved relative to the plasma outlet. For example the substrate can be moved past the plasma outlet or the plasma outlet can be moved across the substrate surface, particularly if a flexible tube is used to extend the plasma.

An alternative embodiment of the current invention uses diffuse dielectric barrier discharge plasma generating apparatus in which the plasma is generated between a pair of electrodes as described in WO 02/28548, wherein liquid based polymer precursors are introduced as an aerosol into an atmospheric plasma discharge or the excited species therefrom. For typical diffuse dielectric barrier discharge plasma generating apparatus, the homogeneous plasma is generated between a pair of electrodes within a gap of from 3 to 50 mm, for example 5 to 25 mm. The generation of steady-state homogeneous diffuse dielectric barrier discharge such as glow discharge plasma at atmospheric pressure is preferably obtained between adjacent electrodes that may be spaced up to 5 cm apart, dependent on the process gas used. The electrodes are radio frequency energised with a root mean square (rms) potential of 1 to 100 kV, preferably between 1 and 30 kV at 1 to 100 kHz, preferably at 15 to 50 kHz. The voltage used to form the plasma will typically be between 1 and 30 kVolts, most preferably between 2.5 and 10 kV however the actual value will depend on the choice of process gas and on the plasma region size between the electrodes. When the plasma is generated between a pair of electrodes in this manner, the substrate is preferably transported through the plasma, that is to say through the gap between the electrodes, as described in WO 02/28548.

Any suitable electrode systems may be utilised. Each electrode may comprise a metal plate or metal gauze or the like retained in a dielectric material or may, for example, be of the type described in WO 02/35576 wherein there are provided electrode units containing an electrode and an adjacent a dielectric plate and a cooling liquid distribution system for directing a cooling conductive liquid onto the exterior of the electrode to cover a planar face of the electrode. Each electrode unit comprises a watertight box having one side in the form of a dielectric plate to which a metal plate or gauze electrode is attached on the inside of the box. There is also a liquid inlet and a liquid outlet fitted to a liquid distribution system comprising a cooler and a recirculation pump and/or a sparge pipe incorporating spray nozzles. The cooling liquid covers the face of the electrode remote from the dielectric plate. The cooling conductive liquid is preferably water and may contain conductivity controlling compounds such as metal salts or soluble organic additives. Ideally, the electrode is a metal plate or mesh electrode in contact with the dielectric plate. The dielectric plate extends beyond the perimeter of the electrode and the cooling liquid is also directed across the dielectric plate to cover at least that portion of dielectric bordering the periphery of the electrode. Preferably, all the dielectric plate is covered with cooling liquid. The water acts to electrically passivate any boundaries, singularities or non-uniformity in the metal electrodes such as edges, corners or mesh ends where the wire mesh electrodes are used.

In another alternative electrode system each electrode may be of the type described in WO 2004/068916, wherein each electrode comprises a housing having an inner and outer wall, wherein at least the inner wall is formed from a dielectric material, and which housing contains an at least substantially non-metallic electrically conductive material in direct contact with the inner wall instead of the "traditional" metal plate or mesh. Examples of suitable dielectric material include but are not restricted to polycarbonate, polyethylene, glass, glass laminates and epoxy filled glass laminates. Preferably, the dielectric has sufficient strength in order to prevent any bowing or disfigurement of the dielectric by the conductive material in the electrode. Preferably the dielectric used has a thickness of up to 50 mm, most preferably 15 to 30 mm. In instances where the selected dielectric is not sufficiently transparent, a glass or the like window may be utilized to enable diagnostic viewing of the generated plasma.

The electrodes may be spaced apart by means of a spacer or the like, which is preferably also made from a dielectric material which thereby effects an increase in the overall dielectric strength of the system by eliminating any potential for discharge between the edges of the conductive liquid.

The substantially non-metallic electrically conductive material may be a liquid such as a polar solvent for example water, alcohol and/or glycols or aqueous salt solutions and mixtures thereof, but is preferably an aqueous salt solution. When water is used alone, it preferably comprises tap water or mineral water. Preferably, the water contains up to a maximum of about 25% by weight of a water-soluble salt such as an alkali metal salt, for example sodium or potassium chloride or alkaline earth metal salts. This is because the conductive material present in such an electrode has substantially perfect conformity and thereby a perfectly homogeneous surface potential at the dielectric surface.

Alternatively, the substantially non-metallic electrically conductive material may be in the form of one or more conductive polymer compositions, which may typically be supplied in the form of pastes. Such pastes are currently used in the electronics industry for the adhesion and thermal management of electronic components, such as microprocessor chip sets. These pastes typically have sufficient mobility to flow and conform to surface irregularities. Suitable polymers for the conductive polymer compositions may include silicones, polyoxypolyolefin elastomers, a hot melt based on a wax such as a silicone wax, resin/polymer blends, silicone polyamide copolymers or other silicone-organic copolymers or the like or epoxy, polyimide, acrylate, urethane or isocyanate based polymers. The polymers will typically contain conductive particles, typically of silver but alternative conductive particles might be used including gold, nickel, copper, assorted metal oxides and/or carbon including carbon nanotubes; or metallised glass or ceramic beads. Specific examples of conductive polymer compositions which might be used include the conductive polymer described in EP 240648 or silver filled organopolysiloxane based compositions such as Dow Corning® DA 6523, Dow Corning® DA 6524, Dow Corning® DA 6526 BD, and Dow Corning® DA 6533 sold by Dow Corning Corporation or silver filled epoxy based polymers such as Ablebond® 8175 from (Ablestik Electronic Materials & Adhesives) Epo-Tek® H20E-PFC or Epo-Tek® E30 (Epoxy Technology Inc).

One example of the type of atmospheric pressure plasma assembly which might be used in accordance with the present invention comprises a first and second pair of parallel spaced-apart electrodes, the spacing between inner plates of each pair of electrodes forming a first and second plasma zone. Such an assembly further comprises a means of transporting a substrate successively through said first and second plasma zones and an atomiser adapted to introduce an atomised liquid or solid coating making material into one of said first or second plasma zones, and is described in the applicant's co-pending application WO 03/086031 which is incorporated herein by reference. In a preferred embodiment, the electrodes are vertically arrayed.

The primer can alternatively be applied to the substrate by plasma enhanced chemical vapour deposition (PE-CVD). Chemical Vapour Deposition is the deposition of a solid on a heated substrate from a chemical reaction in the vapour phase near or on the heated substrate. The chemical reactions that take place may include thermal decomposition, oxidation, carburisation and nitridation. Typically the sequence of events for a CVD reaction comprises the following sequentially:— i) Introduction of reactant gases into a reactor by appropriate introduction means e.g. forced flow,
    ii) diffusion of the gases through the reactor towards a substrate surface
    iii) contact of gases with substrate surface
    iv) chemical reaction takes place between gases and/or one or more gases and the substrate surface
    v) desorption and diffusion away from substrate surface of reaction by-products.

In the case of PE-CVD the gases are directed so as to diffuse through plasma. Any appropriate plasma may be utilised. Non-thermal equilibrium plasmas processes are ideal for the coating of substrates in the form of delicate and heat sensitive webbed materials because generally the resulting coatings are free of micropores even with thin layers. Primer coatings deposited by PE-CVD adhere well to even non-polar materials, e.g. polyethylene, as well as steel, textiles, etc. Non-thermal equilibrium plasma such as for example glow discharge plasma may be utilised. The glow discharge may be generated at low pressure, i.e. vacuum glow discharge or in the vicinity of atmospheric pressure—atmospheric pressure glow discharge, which is preferred.

The substrate may undergo surface pre-treatment prior to the plasma deposition of the primer. Surface treatment can remove contaminants or weak boundary layers, modify the surface energy of the substrate and/or change the surface topography. Examples of contaminants are oils and greases on metals, weak or loose oxides on metals, mould-release agents such as silicones, fluorocarbons and waxes on polymers and additives and low molecular weight material on the surfaces of polymers, which have migrated from the bulk to the surface. Surface pre-treatment can for example be by a plasma technique such as a corona discharge or a plasma flame or by a non-thermal equilibrium plasma such as an atmospheric pressure plasma.

The plasma deposited primer contains functional groups which chemically bond to functional groups in the adherent. One example of functional groups which chemically bond is a hydrosilylation cured silicone, between components having silicon bonded hydrogen groups and other components comprising ethylenically unsaturated groups, typically silicon bonded alkenyl groups. An adherent comprising ethylenically unsaturated groups can be adhered to a substrate plasma coated with a primer that provides an Si—H functional surface on the substrate. Through a hydrosilylation curing reaction, typically catalysed using a platinum group metal based catalyst, bonding will occur at the interface via interaction between the Si—H functional groups of the primer and the free vinyl-functional groups in the adherent silicone formulation. The adhesion promoting, functional plasma polymer primer is designed is such a way as to form specific chemical bonds between the substrate and the adherent coating.

The platinum group metal of the catalyst is preferably selected from platinum, rhodium, iridium, palladium or ruthenium. Platinum group metal containing catalysts useful to catalyse curing of the present compositions can be any of those known to catalyse reactions of silicon bonded hydrogen atoms with silicon bonded alkenyl groups and can be present as platinum group metal or a compound or complex thereof. The preferred platinum group metal for use as a catalyst is platinum. Some preferred platinum based hydrosilation catalysts include chloroplatinic acid, chloroplatinic acid hexahydrate, platinum dichloride, and complexes of such compounds containing low molecular weight vinyl containing organosiloxanes.

Typical silicone coating compositions based on hydrosilylation cure have a stoichiometrically matched level of Si—H and Si-vinyl components to provide a fully cured product. Although such a stoichiometrically matched composition can be used as the adherent, the interfacial reaction between the primer and the adherent is in competition with the curing reaction in the bulk adherent. The adherent can preferably be formulated with an excess of Si-vinyl functional components so that chemical bonding can occur at the primer/adherent interface without detriment to curing in the bulk of the adherent. Thus, the Si-vinyl "rich" adherent formulation in combination with the Si—H functional plasma polymer primer enables increased chemical bonding and increased cross-linking at the primer/adherent interface, which leads to enhanced adhesive bonding. The adherent is designed in such a way as to form specific chemical bonds between the primer and the adherent. The cured coating produced by such a coating process is a flexible non-stick coating adhering strongly to the substrate, for example to a flexible substrate such as plastics film, paper or a textile material; or a rigid substrate such as metal, glass, or a plastic extruded part.

In another example, the functional groups present in the primer are Si—OH or Si—OR groups. These can be used in conjunction with an organopolysiloxane adherent having acyloxy groups, for example acetoxy groups, bonded to silicon or having oxime groups bonded to silicon. Compositions containing Si—OH groups and Si-bonded acetoxy or oxime groups are known as room temperature vulcanisable sealants. The organopolysiloxane adherent having acyloxy groups or oxime groups bonded to silicon can be used to bond two substrates, at least one of which has been treated according to the invention with a plasma deposited primer having Si—OH or Si—OR groups. A first substrate treated according to the invention with the plasma deposited primer can be bonded to the organopolysiloxane adherent coated on a second substrate, which may or may not have been treated according to the invention with a plasma deposited primer. The organopolysiloxane adherent may optionally contain a catalyst such as an organo metal compound, for example stannous octoate or dibutyltin dilaurate, or a titanium chelate.

In a further example, the functional groups present in the primer are primary or secondary amine groups and/or alcohol groups and the adherent is a polymer containing epoxide groups. The amine groups are preferably primary amine groups R—$NH_2$ or form part of aminoalcohol groups such as R—NH—$CH_2$—CH—OH. Alcohol groups present in the primer are preferably activated by adjacent groups as in beta-hydroxyamines. The epoxide-functional polymer preferably contains glycidyl groups and can for example be an epoxy resin derived from a bisphenol or polyphenol or an epoxide-functional acrylic resin. An epoxy adherent can be used to bond two substrates, at least one of which has been treated according to the invention with a plasma deposited primer having R—$NH_2$ or R—NH—$CH_2$—CH—OH groups. Alternatively a substrate which has been treated according to the invention with a plasma deposited primer having R—$NH_2$ or R—NH—$CH_2$—CH—OH groups can be coated with an epoxide-functional coating as adherent.

In an alternative, a primer containing glycidoxy groups can be applied to a substrate by plasma deposition and coated with an adherent containing primary or secondary amine groups and/or activated alcohol groups.

In a further example, the functional groups present in the primer are methylol groups, particularly methylol groups in which the alcohol is activated such as N-methylol groups. The adherent may contain hydroxyl groups which are reactive with the N-methylol groups, for example the adherent can be a hydroxy-functional polyester or polyether coating composition.

In a further example, the functional groups present in the primer are isocyanate groups R—NCO or blocked isocyanate groups. The adherent can contain hydroxyl and/or amine groups, for example the adherent can be a hydroxy-functional polyester or polyether or polyurethane prepolymer. Such an adherent can form a polyurethane coating or can be a polyurethane adhesive used to bond two substrates, at least one of which has been treated according to the invention with a plasma deposited primer having isocyanate or blocked isocyanate groups.

In an alternative, a primer containing hydroxyl and/or amine groups can be applied to a substrate by plasma deposition and coated with an adherent containing isocyanate or blocked isocyanate groups, for example an isocyanate-functional polyurethane prepolymer, which can be utilised as a coating or as an adhesive to bond two substrates.

A primer containing hydroxyl and/or amine groups applied to a substrate by plasma deposition can alternatively be coated with a phenolic resin adhesive as adherent.

In a further example, the functional groups present in the primer are hydroxyl groups, for example alcohol groups, and the adherent is a cyanoacrylate. Such systems find particular use as adhesives for bonding two substrates.

In a further example, the functional groups present in the primer are amino groups and the adherent is a polyimide resin or a bismaleimide resin. The primer can for example be an aminosilane such as aminopropyl triethoxy silane or aminoethylaminopropyl trimethoxy silane.

In a further example, the functional groups present in the primer are epoxy groups, for example glycidyl groups and the adherent is a polysulfide rubber.

The primer can alternatively be a coupling agent. Coupling agents are well described by E. P. Plueddemann in "Silanes and Other Coupling Agents" (Ed K. Mittal, VSP Utrecht, 1992), and are multifunctional compounds designed to provide a means for chemically coupling to both the inorganic surface and to the organic adhesive or coating. These compounds conventionally applied directly to the substrate from dilute solution or may be compounded into an adhesive or coating to generate a self-priming formulation. Such self-priming formulations often require a specific bonding or curing method and/or protocol to ensure that the coupling agent is present at the adhesive or coating/substrate interface.

Types of coupling agent include, but are not limited to, silanes, orthosilicates, other orthoesters, chromium complexes, titanates, thiols and related compounds co-polymers. Thus the process of the invention can for example comprise applying by atmospheric pressure plasma deposition a silane coupling agent containing a substituent functional group which chemically bonds to functional groups in the adherent.

Silane based coupling agents may include silanes with the following functionality: vinyl, chloropropyl, epoxy, methacrylate, primary amine, diamine, mercapto, sulphide or cationic styryl. The primer coupling agent can comprise a mixture of silanes such as $C_6H_5Si(OMe)_3$ and diamine functional silane. The primer can alternatively comprise a mixture of a resin primer and a coupling agent, for example a melamine resin and an epoxy functional silane can be used as primer for an adherent containing amine and/or hydroxyl groups.

Silane coupling agents containing mercapto and/or sulphide groups, for example, are particularly useful as primer treatments to be plasma deposited when the adherent is a sulphur-curable rubber composition based for example on natural rubber or a diene rubber. Examples of such coupling agents are bis(triethoxysilylpropyl)tetrasulfide, bis(triethoxysilylpropyl)disulfide and 3-mercaptopropyl triethoxy silane.

Various inorganic esters have been claimed as coupling agents for reinforced plastics and may be used as primers in the process of the invention, including aminobenzyl phosphonates, dicetylisopropylborate, chrome complexes such as $\{CH_2=C(Me)COO\}Cr(OH)Cl_2.H2O.ROH\}$ and alkoxy compounds of aluminium, zirconium and titanium such as $\{CH2=C(Me)COO\}_3TiOCH(Me)$ as well as zirconates and zircoaluminates such as $HO(Al/Zr)RCOOH$. Methacrylate additives having functional groups such as COOH, $CH_2CH_2OH$, $CONH_2$, glycidyl, $CH_2CH(OH)CH_2OPO(OH)_2$, $(CH_2)_3Si(OMe)_3$, $CH_2CHClCH_2OSiCl_3$, or $CH_2CH_2OSi(OMe)_3$ can also used as coupling agents to improve adhesion.

Substrates which may be primer treated by plasma deposition and coated with an adherent according to the invention include but are not limited to metals, including aluminium, steel, and titanium, engineering plastics, including polystyrene, polycarbonate, polyurethane, polypropylene, polyethylene and polyamide, rubbers and elastomers, glass, ceramic materials, clays and minerals, textiles and leather, or composites, including but not limited to glass fibre, carbon fibre, polypropylene fibre and aramid fibre composite materials.

Adherents which are coatings can be applied to the primed substrate by any conventional coating technique. The adherent can be applied by plasma deposition similarly to the primer, but this is generally not necessary. The adherent can for example be applied by spraying, brushing, roller coating, knife over roller coating, extrusion coating, curtain coating, injection moulding, adhesive and sealant manual and automated dispensing systems or powder coating. The adherent can if required be applied from a diluent, for example from a solution or an emulsion The invention can be used in a wide variety of applications including but not limited to applying decorative or corrosion protection coatings or anti-adherent or biocompatible coatings, for example in coating medical devices such as devices to be implanted including drug delivery devices, catheters, electrical leads and cochlear implants. The invention can be used to form seals on pace-makers and neuro-stimulators. The invention can be used to apply coatings or adhesives to electronic devices, printed circuit boards (PCBs), logic devices, biosensors and chemical sensors, MEMS, Lab-on-chip and nanomachines, automotive components such as sensors and electronics, gaskets and sealing, aerospace, aeronautic and marine components and constructions, pumping systems and their components or consumer electronics or for assembly and/or sealing of display devices. The invention can be used to bond construction materials and items such as glazing units, including structural, architectural and multiple glazing units, and solar cells and panels. Any of the adhesive systems described can be rubber toughened for use with construction materials. The invention can be used to bond or coat footwear, clothing and leisurewear, jewellery or sports goods and equipment, or to coat packaging or airbags, or for lamination of polymer films to steel substrates.

In addition to the advantage of improved adhesion by the adherent (coating or adhesive) to a wide range of substrates, the process of the invention using a plasma polymerised primer can give additional benefits. It may allow adhesion to substrates that usually inhibit curing of the adherent. For example, amine groups present in polyamide or polyurethane surfaces inhibit cure of silicone coating systems comprising a polysiloxane having Si—H groups, a polysiloxane having vinyl groups and a platinum catalyst due to "poisoning" of the catalyst. Application of the coating system as a plasma polymerised primer followed by an adherent prevents such inhibition. One example of this inhibition was a leather substrate. Without application of a primer containing Si—H groups, an adhesive comprising a polysiloxane having Si—H groups, a polysiloxane having vinyl groups and a platinum catalyst did not cure. With a plasma deposited primer the adhesive cured.

If desired, an adherent can be formulated so that it requires the surface functional groups in the primer to give strong adhesion, that is to say so that it has little adhesion unless applied over the primer.

Depositing a primer layer that comprises a coupling agent by atmospheric pressure plasma deposition has a number of advantages. The first is that adhesives that do not traditionally contain coupling agents can be used in different applications that were not possible due to levels of adhesion required. Deposition by the atmospheric pressure plasma process can be achieved without the need of solvent (an environmental advantage) or careful control of pH. A further advantage is that coupling agents can be removed from the adhesive formulation. The addition of coupling agents to an adhesive formulation can have an adverse impact on rheology of the adhesive. Removing the coupling agent from the adherent and applying it separately as a primer allows more flexibility in adhesive processing. Formulations that contain coupling agents often require a high cure temperature to thermodynamically drive the coupling agent to the substrate-adhesive interface. By removing the coupling agent from the adherent and applying it separately as a primer cure temperature cycles can be reduced.

The invention is illustrated by the following Examples.

EXAMPLE 1

Polyhydrogenmethylsiloxane primer was deposited onto a stainless steel sheet substrates using an atmospheric pressure plasma assembly of the type shown in FIG. 3. The substrate to be coated placed adjacent to the plasma outlet (18). Process gas, either helium or argon, was introduced through inlet (15). The plasma was generated by applying RF power (30-60 W, 29 kHz) to the electrode (17). The polyhydrogenmethylsiloxane was introduced in an atomised liquid form through inlet (16) at a rate of 5 $\mu L min^{-1}$. The polyhydrogenmethylsiloxane generates a series of free radical species when passing through plasma. These free radicals undergo polymerisation reactions and deposit onto the substrate to form a coating.

A liquid silicone resin having Si-vinyl groups, Dow Corning's Silastic® 9780/50E, was then applied to the surface of the treated steel and thermally cured to form a rubbery solid resin coating. During this curing process, the liquid silicone resin chemically reacts with the Si—H functionality of the plasma coating and this chemically bonds the silicone to the plasma coating, thereby grafting the silicone to the steel surface. After thermal curing, attempts to physically remove this rubbery silicone resin from the steel proved difficult and any removal resulted in cohesive failure within the silicone.

When the Silastic liquid silicone resin was applied to stainless steel that has not been coated with a plasma coating, there was little bonding with the surface and the cured rubbery solid silicone resin was easily peeled from the surface, exhibiting 100% adhesive failure.

EXAMPLE 2

Using the same process described for Example 1, a coating was deposited onto PET (polyethylene terephthalate) film. Polyhydrogenmethylsiloxane was used as the liquid precursor and either helium or argon as the process gas. When Dow Corning's Silastic® 9780/50E was applied to this plasma coated surface and cured, a strong adhesion promotion effect was again detected and the resin could not be removed without damaging the substrate.

EXAMPLES 3 TO 10

An atmospheric pressure plasma assembly of the type shown in FIG. 3 was used to deposit plasma polymerised primer layers of a 50/50 w/w mixture of tetraethoxyorthosilicate (TEOS) and polyhydrogenmethyl siloxane (PHMS) onto a poly(ester terephthalate) (PET) substrate. The plasma power was varied between high (100 W) and low (80 W) as shown in Table 1 below. Helium was used as process gas. The mixture of TEOS and PHMS was introduced in an atomised liquid form through inlet (16) at the flow rate shown in Table 1. The PET substrate was moved past the plasma outlet (18) at a line speed as shown in Table 1. By means of comparison another sample was treated using the plasma in the absence of the liquid precursor (control 1). A further sample of the PET substrate was included for testing that had not been subjected to any plasma treatment (Control 2)

After deposition of the plasma polymerised primer, Silastic® 9280/50 liquid silicone rubber having Si-vinyl groups was applied by blade coating and cured for 3 hours at a temperature of 70° C.

The adhesion of the silicone rubber layer to the PET substrate was measured using a 180° peel test at room temperature. The peel width was ½ inch (12.5 mm) with a peel speed of 1 in. (25 mm)/min. The average peel forces (N/m) of 2 inches (50 mm) of peeling are shown in Table 1.

TABLE 1

| Example | Power | Flow Rate (μL/min) | Line Speed (mm/sec) | Peel Force (N/m) | Failure mode |
|---|---|---|---|---|---|
| 3 | High | 15 | 25 | 1880 | Cohesive |
| 4 | High | 5 | 10 | 322 | Mixed |
| 5 | Low | 5 | 10 | 121 | Mixed |
| 6 | Low | 15 | 10 | 2065 | Cohesive |
| 7 | Low | 15 | 25 | 1111 | Cohesive |
| 8 | High | 5 | 25 | 118 | Mixed |
| 9 | High | 15 | 10 | 154 | Mixed |
| 10 | Low | 5 | 25 | 91 | Mixed |
| Control 1 | High | 0 | 10 | 10 | Adhesive |
| Control 2 | N/A | N/A | N/A | 30 | Adhesive |

As can be seen from Table 1, the coatings over a primer applied by the process of the invention showed an adhesive force to the substrate (peel strength) one or two orders of magnitude higher than the controls which had not been pretreated or only plasma pretreated. In particular, Examples 3, 6 and 7 showed such good adhesion that the test measured cohesive failure within the silicone rubber layer rather than adhesive failure between the coating and substrate.

The invention claimed is:
1. A method of bonding an adherent to a substrate, the method comprising:
  applying a primer, which contains Si—H groups, to the substrate by plasma deposition;
  applying the adherent, which comprises a polyorganosiloxane containing ethylenically unsaturated groups bonded to silicon, to the primer treated surface of the substrate; and
  bonding the adherent to the primer treated surface of the substrate with a hydrosilylation reaction to form a hydrosilylation cured silicone wherein the Si—H groups of the primer chemically bond to the ethylenically unsaturated groups in the adherent.
2. A method according to claim 1, characterised in that the primer is deposited with a non-equilibrium atmospheric pressure plasma generated within a dielectric housing having an inlet and a plasma outlet through which a process gas flows from the inlet to the plasma outlet past at least one electrode, and the substrate to be treated is positioned adjacent to the plasma outlet so that the substrate is in contact with the plasma and is moved relative to the plasma outlet.

3. A method according to claim 2, characterised in that a process gas and the primer are passed through an atomiser in which the process gas atomises the primer.

4. A method according to claim 2, characterised in that the primer is introduced in atomised form.

5. A method according to claim 4, characterised in that a process gas and the primer are passed through an atomiser in which the process gas atomises the primer.

6. A method according to claim 1, characterised in that the primer is introduced in atomised form.

7. A method according to claim 6, characterised in that the primer in atomised form is injected into a plasma downstream from a electrode.

8. A method according to claim 6, characterised in that a process gas and the primer are passed through an atomiser in which the process gas atomises the primer.

9. A method according to claim 1, characterised in that the primer is a silane coupling agent containing a substituent functional group which chemically bonds to functional groups in the adherent.

10. A method according to claim 1, wherein the adherent is an adhesive coated on a second substrate.

11. A method according to claim 1, characterised in that the ethylenically unsaturated groups of the polyorganosiloxane of the adherent comprise alkenyl groups.

12. A method according to claim 11, characterised in that the alkenyl groups comprise vinyl groups.

\* \* \* \* \*